(12) United States Patent  
Lehman et al.

(10) Patent No.: US 7,900,476 B2  
(45) Date of Patent: *Mar. 8, 2011

(54) SYSTEM FOR AND METHOD OF BATCH ANALYSIS AND OPTIMIZATION FOR GLASS MANUFACTURING

(75) Inventors: Richard L. Lehman, Princeton, NJ (US); Warren Blasland, Jr., Wellington, FL (US)

(73) Assignee: Culchrome, LLC, Charlotte, NC (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/047,615

(22) Filed: Mar. 13, 2008

(65) Prior Publication Data

US 2008/0156039 A1 Jul. 3, 2008

Related U.S. Application Data

(60) Division of application No. 11/250,350, filed on Oct. 14, 2005, now Pat. No. 7,565,816, which is a continuation-in-part of application No. 10/988,019, filed on Nov. 12, 2004, now Pat. No. 7,386,997.

(51) Int. Cl.  
*C03C 4/02* (2006.01)  
*C03C 6/02* (2006.01)

(52) U.S. Cl. .......... 65/28; 65/29.11; 65/29.16; 65/29.18; 65/158; 65/160; 65/134.1; 65/135.9; 65/DIG. 13; 700/157

(58) Field of Classification Search .................. 65/29.16, 65/28, 29.11, 29.12, 29.18, 158, 160, 134.1, 65/135.9, 335, DIG. 13; 209/930; 700/157, 700/158

See application file for complete search history.

(56) References Cited

U.S. PATENT DOCUMENTS

| | | | | |
|---|---|---|---|---|
| 4,187,775 | A | 2/1980 | Flender | 100/39 |
| 4,252,551 | A | 2/1981 | Mishimura | 65/28 |
| 4,347,073 | A | 8/1982 | Aubourg et al. | 65/28 |
| 5,399,181 | A | 3/1995 | Sorg | 65/27 |
| 5,524,855 | A | 6/1996 | Lesar | 248/530 |
| 5,588,978 | A | 12/1996 | Argent et al. | 65/29.1 |
| 5,663,997 | A | 9/1997 | Willis et al. | 378/45 |

(Continued)

FOREIGN PATENT DOCUMENTS

| | | |
|---|---|---|
| DE | 10042268 C1 | 1/2002 |
| EP | 0 709 138 A2 | 5/1996 |
| JP | 2001-58846 | 3/2001 |

OTHER PUBLICATIONS

Dalmijn, W.L. et al., "Glass Recycling", *Third International Symposium on Reccycling of Metals and Engineered Materials*, 1995, 993-1011, XP-008058398. Duckett, E.J., "The Influence of Color Mixture on the Use of Glass Cullett Recovered from Municipal Solid Waste", *Conservation and Recycling*, 1979, 3(2), 175-185.  
Efremenkov, V.V. et al., "Dosing of Cullet in Production of Glass Containers", *Glass and Ceramics*, 2002, 59(1/2), 3-4.

*Primary Examiner* — Eric Hug  
(74) *Attorney, Agent, or Firm* — Woodcock Washburn LLP

(57) ABSTRACT

A system for and method of analyzing a cullet stream prior to batch formulation in glass manufacturing. Cullet is fed onto a conveyor where a real-time composition analysis is performed. Contaminants are optionally removed, and a determination is made as to whether the cullet batch color is consistent with a predetermined tolerance threshold. If necessary, the glass batch formulation is modified in view of the cullet analysis. Virgin raw materials requirements of the modified glass batch formulation may then be communicated to the batch controller before sending batch ingredients to the mixing stage and completing the overall glass manufacturing process.

14 Claims, 5 Drawing Sheets

U.S. PATENT DOCUMENTS

| | | | |
|---|---|---|---|
| 5,718,737 A | 2/1998 | Mosch | 65/30.1 |
| 5,741,342 A | 4/1998 | Alexander | 65/136.1 |
| 5,894,938 A | 4/1999 | Ichise et al. | 209/559 |
| 6,144,004 A | 11/2000 | Doak | 209/581 |
| 6,230,521 B1 | 5/2001 | Lehman | 65/29.11 |
| 6,504,124 B1 | 1/2003 | Doak | 209/581 |
| 6,748,883 B2 | 6/2004 | Solis-Martinez | 110/347 |
| 7,386,997 B2 * | 6/2008 | Lehman et al. | 65/28 |

* cited by examiner

SYSTEM FOR AND METHOD OF BATCH ANALYSIS AND OPTIMIZATION FOR GLASS MANUFACTURING

CROSS-REFERENCE TO RELATED APPLICATIONS

The present patent application is a divisional of U.S. patent application Ser. No. 11/250,350, filed Oct. 14, 2005, now U.S. Pat. No. 7,565,816, which is a continuation-in-part of U.S. patent application Ser. No. 10/988,019, filed Nov. 12, 2004, now U.S. Pat. No. 7,386,997, the entire contents of which are hereby incorporated by reference.

FIELD OF THE INVENTION

The present invention relates to the field of glass production. More particularly, the present invention relates to a system and method of determining the constituents of mixed-color cullet and optimizing the quality of glass batch formulations.

BACKGROUND OF THE INVENTION

Cost-effective recycling of materials, such as glass, has become an increasingly important issue because of stresses on the environment and scarcity of resources. Concern about these issues has prompted governmental involvement, including the establishment of governmental guidelines, e.g., "bottle bills." Because of governmental requirements and environmental awareness, American consumers are now recycling at a greater rate than ever before.

Increased recycling of materials reduces the amount of materials, such as glass, plastics, paper, etc., that enter land fills or other waste disposal points. Additionally, recycling significantly reduces the need for manufacturers to use "virgin" materials, and thus preserves environmental resources. Further, the use of recyclables in place of virgin raw materials often reduces energy requirements, eliminates process steps, and reduces waste streams, such as air emissions during product manufacturing. For example, recycled glass requires less energy and emits fewer contaminants during the glass manufacturing process than virgin raw materials. Many states have placed demands on glass manufacturers that require new glass bottles to contain a minimum percentage of recycled glass. For example, in Oregon, glass container manufacturers are required to use at least 35% post-consumer cullet, which is broken pieces of glass. California has even more aggressive laws requiring glass manufacturers to increase use of recycled content to 65%.

However, there are associated issues of complying with these governmental mandates. Prohibitive sorting costs have made it difficult for suppliers to process an adequate quantity of single-colored recycled glass. Often, the glass coming into a material recovery facility (MRF) and/or a glass processing facility, e.g., a site where cullet is cleaned and prepared for shipment to glass manufacturers, is broken, contaminated with other materials, and of mixed color. Such material was previously unusable for glass manufacturing and was used in low value applications or simply placed in a landfill. Currently, however, regulatory requirements and other issues are forcing glass manufacturers to increase the amount of mixed cullet used in their furnaces which, in turn, has established the need to use mixed cullet in the manufacture of glass.

Generally, fewer problems exist when recycling clean sources of glass cullet that are of the same composition as products being manufactured. However, since most cullet is derived from consumer waste, the main issue is how well-segregated the different glass waste streams are, and the consequent level of contamination. Foreign material such as ceramics (such as pottery and china, from restaurants and/or bars); stones, gravel and/or dirt (from poor storage of cullet); ferrous metals (from bottle tops and other scrap); non-ferrous metals (lead foils from wine bottles or aluminum bottle caps); and organics (labels and excessive food residue) can all render a batch of mixed cullet unusable.

In the glass-making process, non-ferrous metals can give rise to higher emissions or can settle out as a layer at the base of the glass furnace. Ceramics may not be incorporated into the melt, and although organics will burn off in most furnaces, they create offensive odor and may present a problem in the crushing machinery used to produce the cullet. Thus, cullet quality and the levels of contamination are of major concern. It would be beneficial to develop a process for reusing mixed cullet, wherein mixed cullet is used like color-sorted cullet, to make new and useful glass products.

Glass manufacturers are especially concerned about the quality of glass cullet supplied from post-consumer streams. With glass batch formulations now able to contain increased amounts of mixed cullet (e.g., glass of mixed-colors, typically green, amber, and flint/clear), the mixed cullet or single-colored cullet glass received by glass manufacturers should consistently meet the specifications given by the suppliers. Glass manufacturers rely upon these specifications, which specify glass compositions and levels of impurities, to develop a glass batch recipe, or formulation, for manufacturing bottles.

Generally, the glass making operation is a semi-continuous batch process where each batch, containing cullet and other raw materials, is heated to product a glass melt having a desired final composition. The batch raw materials may also contain, in whole or part, virgin raw materials that were not derived from post-consumer waste streams. The desired final composition is established by a batch formulation using data concerning the number, weight, and/or and character of the cullet and virgin raw materials. Individual batches, however, may be greatly affected by the amount and character of cullet additions. For example, cullet additions may affect, amongst other processing variables, the viscosity and absorptivity of the molten glass mixture and the color of the final product. Thus, batch-to-batch variability may impact end product color, composition, and quality. The cullet specifications provided by a material recovery facility, or other glass processing facility, may not be accurate and glass manufactures must often guesstimate batch formulations due to overly generalized, or simply inaccurate, data. For example, supposed single-color amber cullet from a processor may actually contain five to ten percent of other colored glass and/or varying levels of ceramic and organic contamination. This discrepancy between the processor's cullet specification and the actual composition/character of the supplied cullet will likely result in inter-batch variability and negatively impact glass product color uniformity and quality. Cullet composition variability has been tolerated by the glass industry so long as use of mixed cullet was low, thus not significantly affecting the glass product color or composition. As mixed cullet use levels increase, there is an greater need to reduce or mitigate color variability to ensure that the color of glass manufactured from the mixed cullet is of uniform color, composition, and quality. Thus, real-time analysis of mixed cullet composition coupled with real-time batch formulation, as the cullet is introduced into the glass manufacturing process, would be beneficial in ensuring uniformity of as-manufactured glass products.

One method of using mixed-colored cullet for glass manufacturing is described in U.S. Pat. No. 5,718,737, entitled, "Method of Recycling Mixed-Colored Cullet into Amber, Green, or Flint Glass." The '737 patent, herein incorporated by reference, describes how mixed-colored cullet glass is recycled into amber colored glass by regulating the additive amounts of iron, carbon, sulfur, and sulfur compounds in the mixture to impart the desired reddish-brown hue. While the '737 patent provides a suitable method of using mixed-colored cullet for glass manufacturing, it does not address the variability within the batch formulations as a result of the variations in the mixed cullet supply. Nor does the '737 patent provide real-time analysis of the composition of mixed cullet as it is introduced into the glass manufacturing process to allow for batch formulation adjustment to ensure end-product uniformity.

U.S. Pat. No. 6,230,521, entitled, "Method of Recycling Batches of Mixed-Color Cullet into Amber, Green, or Flint Glass with Selected Properties," herein incorporated by reference, describes an automated method for recycling mixed-colored cullet glass into new glass products. A computer-controlled process identifies the virgin glass raw materials, the desired target glass properties, the composition of a batch of mixed-colored cullet, and the quantity of cullet to be used in the glass melt. The computer controlled process automatically determines the proper amounts of virgin glass raw materials to add to the batch of mixed-colored cullet so that recycled glass is produced that has the desired coloring oxides, redox agents, and glass structural oxides in the proper proportion. While the '521 patent provides a suitable method of recycling mixed-color cullet glass into new glass products, it does not provide a method of removing impurities from the cullet within the glass manufacturing process prior to being introduced within the glass batch. One method of identifying cullet composition is provided by U.S. patent application Ser. No. 10/988,018, entitled "Method of Analyzing Mixed-Color Cullet to Facilitate Its Use in Glass Manufacture," herein incorporated by reference.

Mixed cullet is processed and cleaned by entities, such as an material recovery facility and/or a cullet processor, before it is shipped to a glass manufacturer. The composition of mixed cullet depends on municipal sources and the color balance of the cullet may vary over time in a way that may not be reflected in a supplier specifications when the glass cullet is shipped to the glass manufacturer. These variations in the color of the mixed cullet should, ideally, be mitigated by the glass batch formulation in order to maintain uniform end-product color. Furthermore, the supply of mixed cullet often contains residual contaminants, such as ceramics and other impurities, that have escaped the cleaning process. These impurities, also of serious concern to glass manufacturers, will likely contribute to inconsistent quality and composition of the as-manufactured glass if modifications to the batch formulation are not made.

There exists a need in the art for a method of mitigating compositional variations in glass batch formulations due to the mixed cullet variations. In order to further optimize the cullet and therefore glass batch quality, there also exists a need in the art for a system and method for further removing impurities from the cullet within the glass manufacturing process prior to the cullet being introduced within the glass batch melt.

SUMMARY OF THE INVENTION

Certain aspects of the present invention provide a method of determining the constituents of mixed cullet to facilitate its use in glass manufacture. More specifically, the method of the present invention determines the composition of mixed cullet constituents, such as, but not limited to, three-color mixed cullet constituents. However, mixed cullet may likewise include two, four, five, or more colors. Certain preferred embodiments of the present invention disclose a system for and method of compositional analysis of cullet constituent particles using various analysis techniques that facilitate real-time adjustment of a glass batch formulation to compensate for any discrepancies between the determined mixed cullet composition and specifications provided by a mixed cullet supplier. Real-time, as used herein, may be understood to encompass the operating and response time of the glass batch manufacturing process. Thus, aspects of the present invention contemplate those situations of instantaneous operating and response times, as well as those situations where there is a time differential between the operating and response time of the process.

Further, the analysis techniques may directly determine composition, for example using X-ray, infra-red, or Raman spectroscopy, or may predicatively determine composition by comparison of physical characteristics such as, but not limited to, optical opacity/transmission, color, size, aspect ratio, shape, texture, etc. Optical opacity/transmission may be a preferred analysis technique. Still further, color analysis may be a more preferred analysis technique. Thus, the analysis techniques may include use of an optical imaging system. The system for and method of the preferred embodiments of the present invention allow for real-time adjustment of the batch formulation, which allows glass manufacturers to consistently manufacture glass of uniform color and quality. For example, batch recipe adjustment may take place within sixty seconds of mixed cullet characterization. The system and method of the present invention may also allow for the option of a final cleaning of the mixed cullet to further enhance the cullet, and end-product, quality.

A presently preferred embodiment of the invention utilizes an optical imaging device that operatively communicates with a batch controller (e.g., computer controller) to provide real-time optical imaging analysis data of supplied mixed cullet. Still more preferably, the optical imaging device and batch controller, either singly or in combination, are in operative communication with batch formulation software. The batch formulation software compares the determined composition of mixed cullet supply with a desired tolerance threshold, and determines, in real-time, any necessary adjustments to the batch recipe. Batch formulation software may print, store to memory, or both, a recalculated batch recipe for later implementation. These adjustments, if any, may be communicated to the batch controller, in real-time, for implementation in the batch process to ensure that the end-product is of consistent color and quality. For example, the batch formulation software may vary the amount of certain glass manufacturing materials, including virgin raw materials, added to the batch to mitigate the effect of a greater-than-expected number percentage of green glass constituents in the mixed cullet. Still further, batch formulation software may compensate in view of, but not limited to, number percentage per color, weight percentage per color, number per color, and/or weight per color of mixed cullet constituents. The tolerance threshold may be the mixed cullet color specification provided by the cullet supplier. Alternatively, the tolerance threshold may be a preset or user-defined specification as determined by the glass manufacturer. The glass manufacturing system and method may also allow for a final cleaning of mixed cullet supply via air jets to eliminate residual contaminants or impurities, thereby further enhancing the quality of mixed cullet supply. These air jets may displace the contaminates for eventual landfill disposal.

Certain preferred embodiments of the present invention disclose a method of creating recycled glass products by providing a supply of mixed cullet, determining at least one of the number percent, weight percent, and composition of the mixed cullet constituents, comparing the composition of the mixed glass cullet constituents to a desired tolerance threshold, and optionally diverting those constituents that do not satisfy the threshold. These steps are preferably conducted prior to combining the mixed cullet with virgin raw materials to produce a batch. Still further, the characterized mixed cullet data is used by batch formulation software to recalculate the batch recipe to account for the weight, or composition, or both, of the mixed cullet constituents. For example, batch formulation software may compensate in view of the number percentage per color or weight percentage per color of mixed cullet constituents. Still further, certain embodiments of the present invention envision situations where the batch formulation software recalculates the batch recipe instantaneously (e.g., as analysis data is provided from an optical imaging device) or those situations where a time differential exists between analysis and recalculation. Batch formulation software may immediately implement the recalculated batch formula. Alternatively, batch formulation software may print, store to memory, or both, the recalculated batch recipe for later implementation. In this regard, batch formulation software, in operative communication with at least one batch control controller, may further vary the delivered amount of virgin raw materials, and other glass making materials, that are combined with mixed glass cullet to create at least one glass-making batch. And recycled glass products, such as glass bottles, are produced from the batch formed in accordance with the glass batch formulation. Thus, certain preferred embodiments of the present invention reduce the time and expense of pre-separating and/or remixing mixed cullet during glass manufacturing.

Another aspect of the present invention provides a glass cullet processing system having a conveyor suitable to convey glass cullet, a feeder for feeding a supply of glass cullet to the conveyor, and an analyzer capable of determining mixed cullet composition, as the cullet passes the analyzer on the conveyor. Further, an optional diverting device selectively diverts those constituents that do not satisfy a threshold analysis so as to bring the conveyed mixed cullet into compliance with a tolerance threshold for certain measured contaminates. A mixer then mixes the mixed cullet with virgin raw materials in accordance with a glass batch formulation resulting in a desired glass end-product composition.

DETAILED DESCRIPTION OF ILLUSTRATIVE EMBODIMENTS

The method of recycling color mixed cullet with the above-mentioned beneficial features in accordance with the presently preferred embodiment of the invention will be described below with reference to FIGS. 1-4. It will be appreciated by one skilled in the art that the description given herein with respect to those figures is for exemplary purposes only and is not intended in any way to limit the scope of the invention.

A preferred embodiment of the present invention includes a system for and method of compositional analysis of mixed cullet using optical imaging techniques that facilitate real-time adjustment of a glass batch formulation to compensate for possible discrepancies between the as-measured mixed cullet composition and the composition as-expected from a cullet supplier (for example, mixed cullet specifications provided by a cullet supplier). Further, the system for and method of the present invention allow for real-time adjustment of the batch recipe by applying real-time mixed cullet compositional analysis to batch formulation software, thus allowing glass manufacturers greater certainty in manufacturing glass of uniform color and quality. Batch control software may be in accordance with, for example, U.S. Pat. No. 6,230,521, entitled, herein incorporated by reference. The system and method of the present invention also allow for the option of a final cleaning of the mixed cullet to further enhance the cullet quality.

The system and method of the present invention provides a computer controlled process, using batch formulation software, that identifies the composition of a batch of mixed cullet, the desired target glass composition, and the quantity of cullet selected to be used in the glass melt. The batch formulation software determines the proper amount of virgin glass raw materials to add to the batch of mixed cullet so that the glass produced from the mixed glass cullet and virgin glass materials has the desired final composition. The recycled glass is then used to make glass products such as beer bottles.

Figure 1:
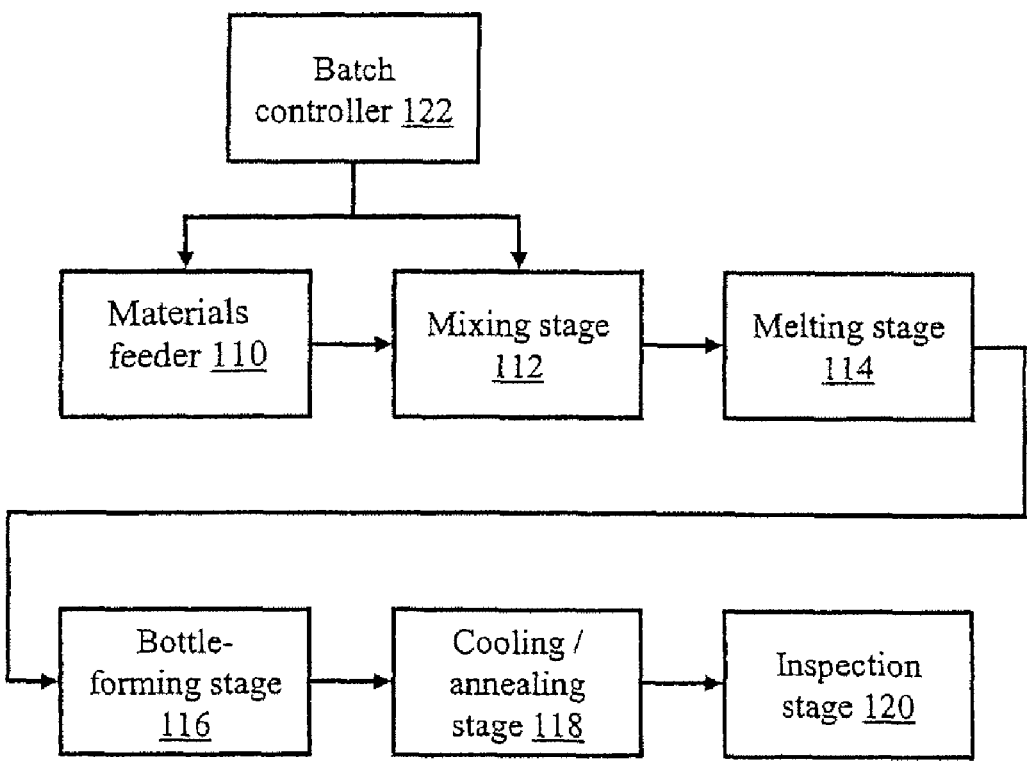
FIG. 1 illustrates a glass manufacturing system for manufacturing glass using color mixed cullet, in accordance with the invention.

FIG. 1 illustrates a glass manufacturing system 100 for manufacturing glass using mixed cullet in accordance with the invention. Glass manufacturing system 100 includes a materials feeder 110, a mixing stage 112, a melting stage 114, a bottle-forming stage 116, a cooling/annealing stage 118, an inspection stage 120, and a batch controller 122 that controls the materials feeder 110 and the mixing stage 112.

Figure 2:
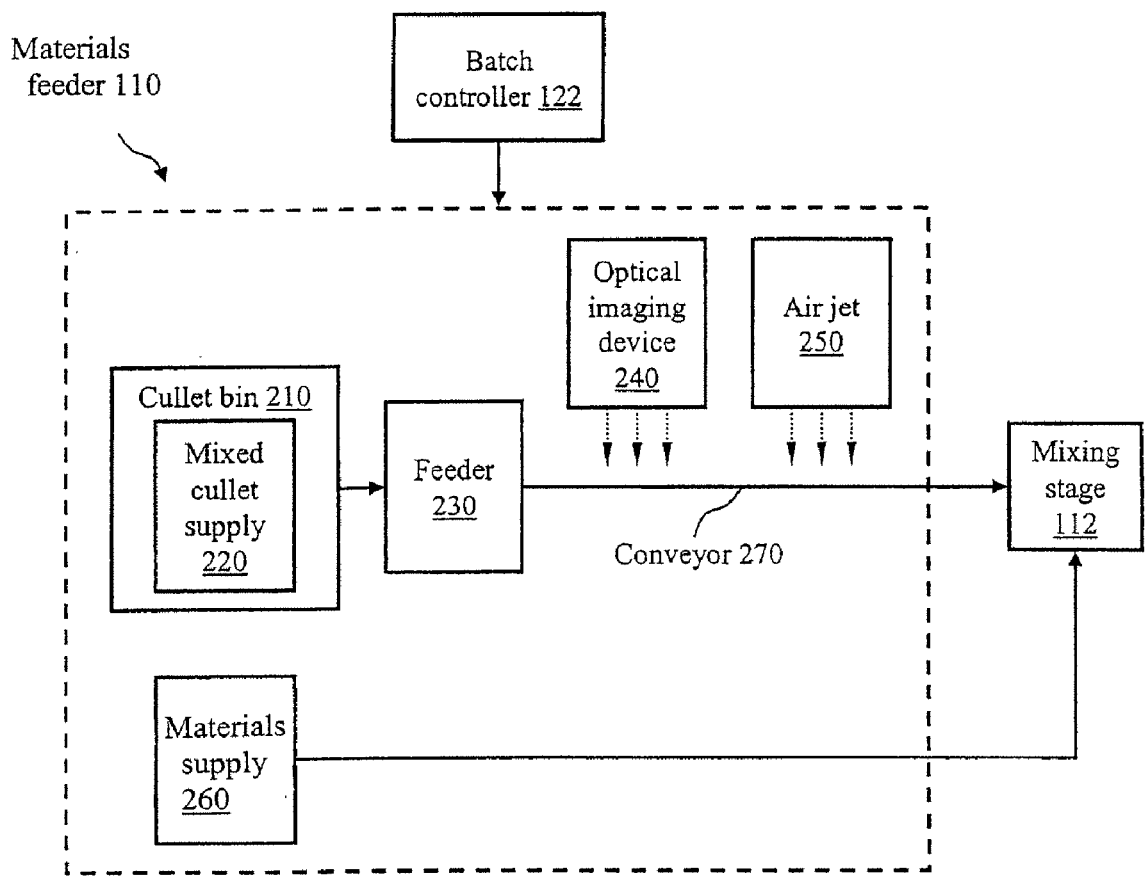
FIG. 2 illustrates elements within a materials feeder that are used to perform batch analysis and optimization, in accordance with the invention.
Figure 3:
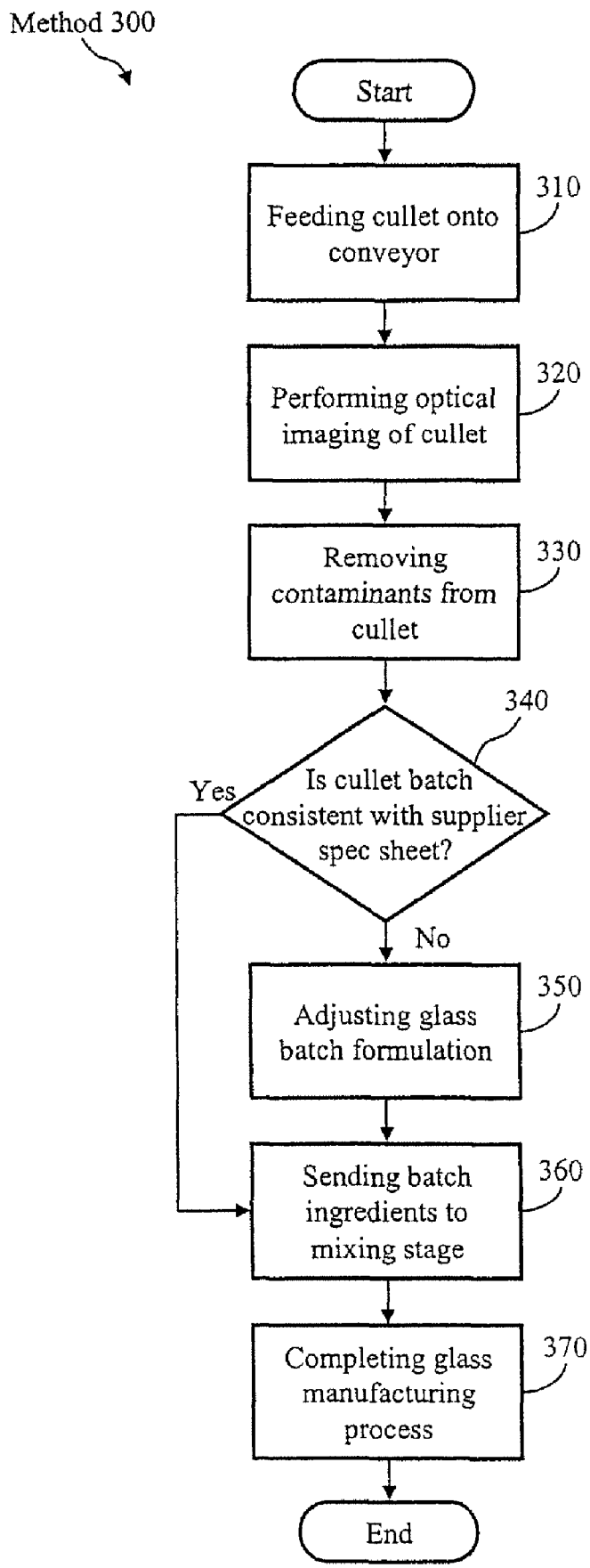
FIG. 3 illustrates a flow diagram of a method of imaging and cleaning mixed cullet, in accordance with the invention, to ensure uniformity and optimization of cullet quality for glass manufacturing.

Materials feeder 110 is representative of any device for handling, feeding, and/or analyzing raw materials, in accordance with the invention and further described in more detail in reference to FIGS. 2 and 3. Materials feeder 110 may contain any number of typical virgin raw materials for making glass, such as sand, soda ash, limestone, and nepheline syenite. In accordance with certain aspects of the invention, materials feeder 110 may further contain mixed cullet, such as three-color mixed cullet containing flint, amber, and green glass.

Mixing stage 112 is representative of well-known mechanical mixers used in glass making for developing a glass batch (e.g., mixing virgin raw materials and mixed cullet obtained from materials feeder 110). Also added at this stage are colorant modifiers, e.g., colorizers and decolorizers, such as described in to U.S. Pat. No. 6,230,521, herein incorporated by reference.

Melting stage 114 is representative of a well-known melter or furnace apparatus for heating, and thereby melting, the virgin raw materials and mixed cullet after they are mixed within mixing stage 112. Within melting stage 114, the virgin raw materials and mixed cullet combine with each other, first in a solid state, then in a solid-liquid mixture, then in a complete liquid state. The resulting liquid is then homogenized because of the very high temperatures of typically between 1400° C. and 1600° C.

Bottle forming stage 116 is the stage within glass manufacturing system 100 in which the end product is formed from the viscous liquid obtained from melting stage 114 via well-known glass blowing, or press and blowing process, which is a process of forming glass hollow ware from molten glass by means of an "IS machine." This incorporates the necessary elements of pressing and/or blowing in a two stage process with appropriate molds, thereby forming a desired shape, such as a bottle shape.

Cooling/annealing stage 118 is the stage within glass manufacturing system 100 in which the end product, such as a bottle, is slowly cooled and annealed, which is the well-known process of reheating the glass to a temperature where strains are rapidly removed from the glass by viscous relaxation and then slowly allowing it to cool at a uniform rate, thereby preventing permanent strain from developing within the glass.

Inspection stage 120 is the stage within glass manufacturing system 100 in which the end product is inspected to determine whether it meets the expected quality and color specifications. For example, one inspection operation determines the mechanical integrity of the end product. In the case of bottles, the end product is inspected for bubbles and cracks. This is a bottle-to-bottle inspection event. A second operation determines whether the color specification is met by using a spectrophotometer to measure the percent transmission of the glass of each individual wavelength throughout the visible spectrum, i.e. about 400 to 700 nm wavelength. The profile of this measurement defines the color of the glass, which is then compared against an expected color specification. As color may vary due to gradual changes in batch composition, this is not a bottle-to-bottle inspection; instead, the color inspection is typically a periodic inspection, which at longer intervals, from hours to days depending on the variability of the batch.

Batch controller 122 is any conventional computer, such as a personal computer, laptop computer, or networked computer, which is loaded with control software used for storing and managing the glass formulation and mixing parameters of glass manufacturing system 100, thereby controlling the feed of glass-making materials from materials feeder 110 to mixing stage 112. The batch controller 122 may be a stand-alone computer from which batch formulation parameters are printed out and hand entered into the plant batch weigh-out and mixing equipment, or it may be integrated with the plant batch weigh-out and mixing equipment via a computer network. In highly integrated glass manufacturing facilities all functions may be integrated into the overall glass plant control computer network system.

The operation of the glass manufacturing system 100 of FIG. 1 is generally described as follows. Batch formula software, in operative communication with batch controller 122, determines the overall glass formulation using typical glass manufacturing materials. Batch formulation software 126 may operatively communicate with batch controller 122 via any number of network computer communication protocols such as, for example but without limitation, an Ethernet or Wi-Fi network. The glass formulation may be based upon the end-product specification, such as the color specifications. In accordance with certain aspects of the current invention, glass manufacturing system 100 performs mixed cullet color analysis to determine cullet composition and its conformity with the specifications listed in a batch formulation specification, or "spec" sheet provided to the glass manufacturer by for instance, the mixed cullet supplier. This analysis may occur with materials feeder 110, or anytime before mixing stage 112. This analysis, and further optimization, is described in more detail in reference to FIGS. 2 and 4.

Figure 4A:
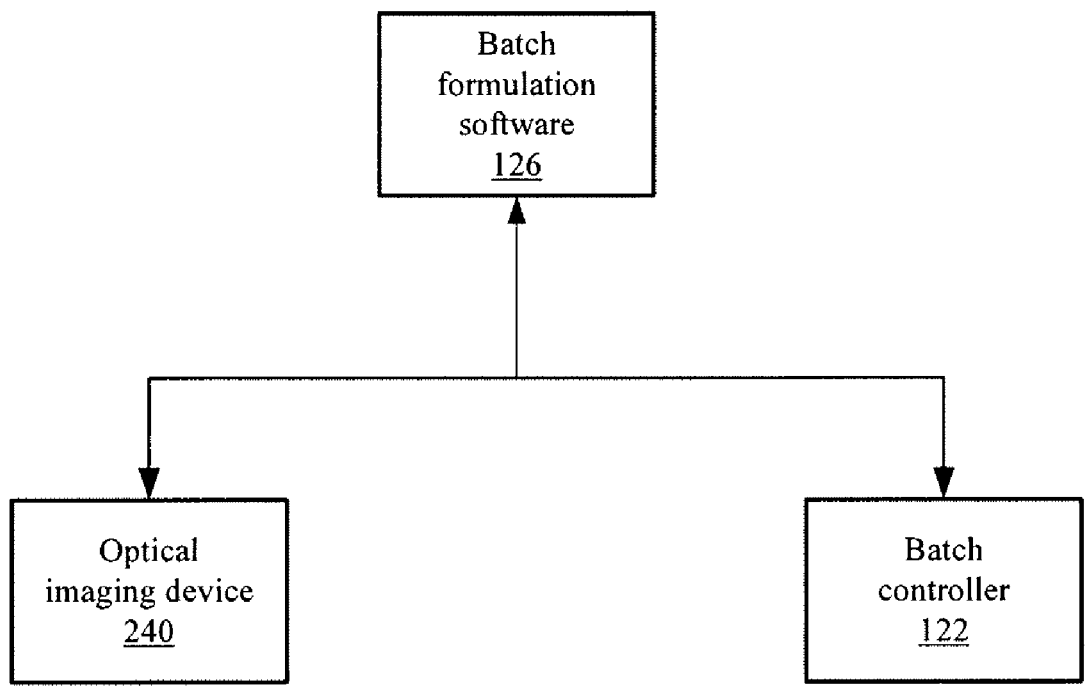
FIG. 4 illustrates exemplary communication relationships among elements of a presently preferred embodiment of the present invention.
Figure 4B:
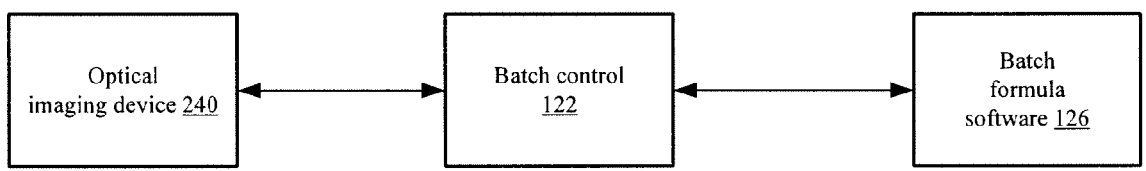

Subsequently, under the control of batch controller 122, a quantity of mixed cullet, fed to a conveyor, is analyzed in real-time. This data is operatively communicated to batch formulation software 126 to modify the batch recipe based upon at least one of the number percent, weight percent, and composition of the mixed cullet constituents to be used in the glass batch. Exemplary operative communication relationships are shown in FIGS. 4A and 4B. For example, FIG. 4A shows the optical imaging device 240, batch controller 122, and batch formulation software 126 in a peer network relationship wherein each element may directly communicate with any of the other elements. For example, in FIG. 4A, optical imaging device 240 may operatively communicate with batch formulation software 122. FIG. 4B show the elements in a serial, or cascaded, relationship wherein the optical imaging device 240 operatively communicates with batch controller 122, which operatively communicates with batch formulation software 126. The modified batch formulation requirements are operatively communicated to at least one batch controller, that weighs and delivers the required quantities of virgin glass raw materials. To that end, a specific quantity of each virgin raw material is fed at a predetermined rate from materials feeder 110 into mixing stage 112. Mixing stage 112 then physically mixes the raw materials as supplied from materials feeder 110 for a predetermined period of time before delivering the blended raw materials into melting stage 114.

Once mixing is complete, the blended raw materials are fed from mixing stage 112 into melting stage 114, in which the raw materials are heated to between 1400 and 1600° C. and combined with each other, first in a solid state, then in a solid-liquid mixture, then in a complete liquid state.

The molten raw materials then pass from melting stage 114 into bottle-forming stage 116, in which the end product is formed from the viscous liquid via the well-known glass blowing or press and blowing process, which is a process of forming glass hollow ware from molten glass by means of an "IS machine." Once the bottles are formed, they pass from bottle-forming stage 116 to cooling/annealing stage 118, in which the amber bottles are allowed to cool at a slow, uniform rate, thereby removing stress within the glass.

Inspection stage 120 is the stage within glass manufacturing system 100 in which the end product is inspected to determine whether it meets the expected quality and color specifications. Once the inspection process within inspection stage 120 is complete, those bottles that pass inspection, typically 88-94%, are bulk-packed and shipped to the end user. Conversely, those bottles that fail inspection, typically 6-12%, are crushed, thereby forming cullet, and returned to materials feeder 110.

FIG. 2 illustrates further elements within materials feeder 110 for performing mixed cullet analysis, in accordance with certain preferred aspects of the present invention. This batch analysis and optimization is performed to analyze the mixed cullet to determine conformity with the specifications listed in a batch formulation specification, or spec sheet provided to the glass manufacturer by the mixed cullet supplier, or similar provider. As illustrated in FIG. 2, materials feeder 110 further includes a cullet bin 210, which contains a mixed cullet supply 220, a feeder 230, an optical imaging device 240, an optional air jet 250, and a materials supply 260. Batch controller 122, also shown in FIG. 2, operatively communicates with at least one of batch formulation software 126 and optical imaging device 240. Exemplary operative communication relationships are shown in FIGS. 4A and 4B. Batch controller 122 and air jet 250 of materials feeder 110 may also be in operative communication, for example, via a conventional network, such as an Ethernet or Wi-Fi network. Furthermore, FIG. 2 shows an outlet of feeder 230 feeding mixing stage 112 of glass manufacturing system 100 via a conveyor 270. Similarly, an outlet of material supply 260 feeds mixing stage 112 of glass manufacturing system 100.

Cullet bin 210 is an industrial sized silo or storage bin used for storing mixed cullet supply 220. Mixed cullet supply 220 may have any number of colored constituents including, at least two of flint, amber, and green glass. An exemplary three-color mixed cullet color distribution is approximately 55% flint (clear), 30% amber, and 15% green. Mixed cullet supply 220 may be composed of mixed, broken pieces of glass cleaned and processed by an material recovery facility, or other cullet processor, and supplied to glass manufacturing system 100. Feeder 230 is a conventional feeding mechanism, such as an electronic vibrating feeder, which feeds mixed cullet supply 220 upon a transport mechanism, such as a conveyor belt 270, which transports mixed cullet supply 220 through materials feeder 110. Optical imaging device 240 is a standard optical imaging device, such as a Compact Module from Binder and Co (Gleisdorf, Austria), used to image and analyze the composition of the glass fragments. Optional air jet 250 is a standard industrial air jet, which separates contaminants and other constituents from mixed cullet supply 220 through the blowing of separate streams of air and which is incorporated into numerous available systems, such as the Binder system noted above. The air jetted materials are then removed from the glass manufacturing system 100. For example, the air jetted material may be deposited on a conveyor which transports such material to a waste bin, to be collected and transported to a landfill for ultimate disposal. Batch formulation software 126, in operative communication with batch controller 122, processes analysis data received from optical imaging device 240 and compares that information to the as-expected cullet constituents received from the supplier (for example, a supplier's spec sheet). The batch formulation may be recalculated should the analysis data not match the information obtained from the supplier's spec sheet. Particularly, batch formulation software 126 may recalculate the virgin glass materials needed to mitigate any cullet compositional discrepancies. The batch formulation software 126 then communicates such recalculated needs to batch controller 122 which meters, and otherwise delivers, the newly necessary amount of virgin raw materials.

Virgin raw materials from materials supply 260 includes a collection of typical virgin raw materials for making glass, such as sand, soda ash, limestone, and nepheline syenite; other additives, such as colorant modifiers; oxidizing agents, such as nitrates or sulfates; and reducing agents, such as coal. The virgin raw materials from materials supply 260 typically have the consistency of beach sand. Materials supply 260 and mixed cullet supply 220 are both fed into mixing stage 112, within which these ingredients are combined.

In operation, mixed cullet supply 220 is fed from cullet bin 210 into feeder 230. Subsequently, mixed cullet supply 220 exits feeder 230 and is transported to mixing stage 112 via conveyor 270, which is representative of a standard conveyor belt system or any other conventional transport means. In one example arrangement, mixed cullet supply 220 subsequently falls from one section of conveyor 270, through some amount of free space, and onto a second section of conveyor 270. While mixed cullet supply 220 falls through this free space, optical imaging device 240, in proximity to the falling mixed cullet, performs image analysis of each particle of mixed cullet. Optical imaging device 240, operatively communicates the data to batch controller 122, which is in operative communicate with batch formulation software 126. The compositional data includes, but not limited to, information concerning the color, or other optical characteristics, of the individual cullet constituents. In real-time, batch formulation software 126 compares the data against spec sheet information provided by a cullet supplier. Batch formulation software 122 may thus also provide a valuable metric of expected-versus-actual cullet characterization while also informing the glass manufacturer of the composition and color-balance of mixed cullet supply 220. Color data may also be used as the comparison metric. More preferably, number percentage per color, weight percentage per color, number per color, and/or weight per color of mixed cullet constituents may used, singly or in combination, as comparison metrics. In real-time, batch formulation software 122 determines if any discrepancies exist between the data from optical imaging device 240 and the expected color balance. In addition to color balance, the tolerance threshold may also include, but not limited to, allowable number, weight, or percentages thereof, of ceramic impurities, organic impurities and/or "other colors" in cullet supply. Batch formulation software 126 may then recalculate batch recipe in view of the cullet discrepancies. Batch formulation software 126 may print, store to memory, or both, the recalculated batch recipe for later implementation. In this regard, the recalculated batch recipe may be operatively communicated to at least one location to be reviewed by human personnel, such as a user, namely a glass plant operations manager or glass technologist, to determine if implementation is desired; thus the glass recipe may be operatively communicated to a display at the glass manufacturing facility and/or a display at a remote research center. Alternatively, batch formulation software 126, in operative communication with batch controller 122, may meter in real-time, and otherwise deliver, appropriate amounts of virgin raw materials from material supply 260 to satisfy the recalculated batch recipe. For example, batch formulation software 126 makes real-time adjustments to the batch formulation by requiring more copper oxide to compensate for high levels of green glass in the mixed cullet intended to used in the manufacture of amber glass. This increased amount to copper oxide is communicated to batch controller 122 which delivers said amount of virgin raw materials to the glass-making batch. Batch formulation software 126, using data from optical imaging device 240, may also determine whether there are any contaminants, such as ceramic particles, still present within the mixed cullet. If so, batch formulation software 126 operatively communicates to batch controller 122 in order to activate air jet 250, which may be located in proximity to the falling mixed cullet. Air jet 250 thereby removes certain remaining contaminants from, and provides additional cleaning of, mixed cullet supply 220. Upon reaching the end of conveyor 270, mixed cullet supply 220 falls into mixing stage 112, where it combines with virgin raw materials from materials supply 260, which is feeding mixing stage 112 of glass manufacturing system 100.

FIG. 3 illustrates a flow diagram of depicting imaging and optional cleaning of mixed cullet, in accordance with the invention, to enhance cullet quality for glass manufacturing. Method 300 includes the following steps:

Step 310—Feeding cullet onto conveyor 270. In this step, mixed cullet supply 220 is fed from cullet bin 210 and onto conveyor 270 via feeder 230.

Step 320—Performing optical imaging of cullet. In this step, optical imaging of mixed cullet supply 220 by optical imaging device 240 occurs as it is transported along conveyor 270 to mixing stage 112. In one example arrangement, mixed cullet supply 220 falls from one section of conveyor 270, through some amount of free space, and onto a second section of conveyor 270. While mixed cullet supply 220 is falling through this free space, optical imaging device 240, which is located in proximity to the falling mixed cullet supply 220, performs image analysis of each particle of mixed cullet. Optical imaging device 240 operatively communicates imaging data to batch formulation controller 122. Optical imaging device 240 may be any number of devices capable of color and other composition analyses. Thus, the scope of optical imaging device 240 encompasses devices capable of directly determining composition, for example using X-ray, infra-red, or Raman spectroscopy, or predicatively determine composition by comparison of physical characteristics such as, but not limited to, optical opaqueness/transmission, color, size, shape, texture, aspect ratio, etc. As an example of analysis performed by such systems, a series of parametrically encoded images are stored in the computer memory of the optical imaging device 240 and the parameters of each particle of glass are compared to these reference images and parameters. If a subject particle of material in the raw material stream conforms parametrically to known images of acceptable glass particles in memory, within statistically threshold ranges, the particle is accepted. If it parametrically falls outside the threshold range it is deemed an impurity and optionally rejected from the stream at step 330. Alternatively, color data may also be used as the comparison metric. More preferably, number percentage per color, weight percentage per color, number per color, and/or weight per color of mixed cullet constituents may used, singly or in combination, as comparison metric. Still further, when integrated over several batches (for example, about 200 batches in a typical day), this data may provide an excellent predictive estimate or characterization of the cullet quality of, and/or composition from, particular cullet suppliers. This characterization may then be used as an overall quality control metric in selecting (or rejecting) cullet suppliers. Alternatively, the characterization could be used by the cullet supplier as a quality control metric in self-determining the quality of his cullet or as a comparison to the cullet of other suppliers.

Step 330—Optional step of removing contaminants from cullet. In this step, which could optionally occur concurrently with step 320, batch formulation software 122, via the image data from optical imaging device 240, determines whether there are any contaminants, such as particles of ceramic, still present within mixed cullet supply 220. If so, batch controller 122 activates air jet 250, located in proximity to the falling mixed cullet supply 220, thereby removing by forced air any remaining contaminants in the stream of mixed cullet supply 220 and thus providing a final cleaning event of mixed cullet supply 220.

Step 340—A determination is made as to whether the cullet batch is consistent with the supplier spec sheet. In this step, it is determined whether the composition of mixed cullet supply 220 is consistent with the desired tolerance threshold, in this example, provided as the supplier spec sheet. More specifically, in a real-time operation, batch formulation software 126 compares the measured composition of mixed cullet supply 220, as determined by optical imaging device 240, against the spec sheet information provided by the supplier and identifies any discrepancies between them. If the composition compares favorably (yes), the method proceeds to step 360. If the composition does not compare favorably (no), the method proceeds to step 350.

Step 350—Determining a glass batch formulation: In this step, batch formulation software 126 performs real-time modification of a glass batch formulation in view of the analysis of mixed cullet. For example, batch formulation software may compensate in view of, but not limited to, number percentage per color, weight percentage per color, number per color, and/or weight per color of mixed cullet constituents. As a further example, and as described in U.S. Pat. No. 6,230,521, herein incorporated by reference, a computer-controlled process may automatically determine the proper amounts of virgin raw materials to add to the batch of mixed cullet so that glass produced from the recycled cullet has the desired coloring oxides, redox agents, and glass structural oxides in the proper proportion. Batch formulation software 126 may print, store to memory, or both, a recalculated batch recipe for later implementation. In this regard, the recalculated batch recipe may be operatively communicated to at least one location to be reviewed by a user, such as a glass technologist or glass plant operations manager, to determine if implementation is desired. In this regard, the recipe may be operatively communicated to a display at the glass manufacturing facility and/or a display at a remote research center. The user may, for example, decide not to implement the modified formulation; implement the modified formulation solely for the current batch; or implement the modified formulation for the entire production run (i.e., the remainder of cullet in cullet supply 220). Alternatively, batch formulation software 126, in operative communication with batch controller 122, may meter and otherwise deliver appropriate amounts of virgin raw materials from material supply 260 in real-time. In further example, batch formulation software 126 may provide a greater amount of copper oxide to the batch in order to mitigate the effect of a greater-than expected number percentage of green glass constituents in mixed cullet intended for the manufacture of amber glass. Still further, batch formulation software 126 may provide greater amounts of iron oxide and chemical reducing agents, such as coal, to mitigate the effect of higher-than-expected weight percentage of flint glass constituents in the mixed cullet. In certain instances, off-color or unexpected glass, e.g. dark violet blue, may be optionally rejected as an impurity.

Step 360—Sending batch ingredients to mixing stage. In this step, characterized mixed cullet supply 220 and virgin raw materials from materials supply 260 are fed into mixing stage 112 of glass manufacturing system 100 in specific quantities, as calculated or adjusted in step 350. All ingredients are subsequently blended within mixing stage 112 to physically create the glass batch formulation as determined, or adjusted, in Step 350.

Step 370—Completing glass manufacturing process. In this step, the blended raw materials are fed from mixing stage 112 into melting stage 114, in which the raw materials combine with each other, first in a solid state, then in a solid-liquid mixture, then in a complete liquid state at typically between 1400 and 1600° C. Subsequently, the molten raw materials are fed into bottle-forming stage 116, in which the end product is formed from the viscous liquid via the well-known glass blowing process. Subsequently, the glass product passes into cooling/annealing stage 118, in which the glass product is allowed to cool at a slow, uniform rate, thereby removing stress within the glass. Finally, the glass product passes into inspection stage 120 for a final quality inspection.

The scope of the invention also includes a program storage device readable by a glass manufacturer and storing thereon a program of instructions, for example batch formulation software 126, executable by the glass manufacturer during the process of creating recycled glass products of a particular color from mixed glass cullet having glass of at least two different colors. In this regard, program storage device, having batch formulation software, may be In accordance with the invention, the program of instructions causes the glass manufacturer to accept as inputs a designation of virgin glass raw materials, a designation of the particular color of the recycled glass products, a designation of the transmission, or like, properties of the recycled glass products, a designation of how much of the mixed glass cullet, by weight percent, is to be melted as a fraction of a recycled finished glass from which the recycled glass products are to be created and causes the glass manufacturer to continually determine, from the real-time determination of cullet constituents, the actual composition of the mixed cullet so that the amounts of virgin glass raw materials and, glass coloring agents can be determined so at to produce a recycled glass product with the levels and key glass indicator parameters of glass of the particular color with the specified transmission properties, and composition. The program of instructions further causing the glass manufacturer to output, either to a screen or printer, an indication of the composition for use in the process of creating recycled glass products of a particular color from mixed glass cullet, the composition including weight percentages of the raw materials, the mixed glass cullet, the key glass indicator parameters, and the glass coloring agent levels.

In summary, certain preferred embodiments to the present invention include a glass manufacturing system and method utilizing an optical imaging device 240, in operative communication with batch formulation software 126, in turn said software operatively communicates with a batch controller 122, to provide optical imaging analysis of mixed cullet supply 220. Batch formulation software 126 determines the constituents of mixed cullet supply 220 and accordingly modifies the amount of virgin glass material necessary to yield a desired end-product composition or target batch recipe. The batch formulation may then be fed to the batch controller 122. Furthermore, glass manufacturing system 100 and method 300 allow for the option of a final cleaning of mixed cullet supply 220 to remove residual contaminants, thereby further enhancing the quality of mixed cullet supply 220.

The invention having been disclosed in connection with the foregoing variations and examples, additional variations will now be apparent to persons skilled in the art. The invention is not intended to be limited to the variations and examples specifically mentioned, and accordingly reference should be made to the appended claims to assess the spirit and scope of the invention in which exclusive rights are claimed.

What is claimed:

1. A cullet processing system comprising:
   a conveyor suitable to convey mixed cullet;
   a feeder for providing a supply of mixed cullet to said conveyor;
   an analyzer capable of determining the constituents of said mixed cullet as said mixed cullet passes said analyzer on said conveyor;
   batch formulation software, in operative communication with said analyzer, capable of modifying at least one glass batch formulation in real-time; and
   a feeder that provides a quantity of virgin raw materials, said quantity being in accordance with said modified glass batch formulation; and
   a mixer that mixes said mixed cullet with said virgin raw materials.

2. The system of claim 1, wherein the mixed cullet comprises at least one of amber, green and flint glass.

3. The system of claim 1, further comprising a diverting device that selectively diverts at least one constituent of said cullet from said conveyor so as to bring the conveyed mixed cullet into compliance with a tolerance threshold.

4. The system of claim 3, wherein said diverting device is an air jet device.

5. The system of claim 1, wherein said analyzer comprises an optical imaging device.

6. The system of claim 1, wherein said analyzer comprises an X-ray spectroscopy device.

7. The system of claim 1, wherein said analyzer comprises at least one of an infra-red and a Raman spectroscopy device.

8. The system of claim 1, wherein said analyzer comprises a device capable of measuring at least one of optical transmission properties and optical reflectivity properties of said mixed cullet.

9. The system of claim 1, wherein said analyzer comprises a device capable of determining color of at least one constituent of said mixed cullet.

10. The system of claim 1, wherein said batch formulation software compares the output of the analyzer to a tolerance threshold.

11. The system of claim 3, wherein said batch formulation software operatively communicates with said diverting device.

12. The system of claim 3, wherein the said tolerance threshold comprises a cullet supplier specification.

13. The system of claim 3, wherein the tolerance threshold comprises at least one of a preset and a user-determined specification.

14. The system of claim 1, wherein said batch formulation software operatively communicates at least one modified batch formula to at least one location.

* * * * *